Figure 1:
Figure 2:

July 31, 1962 E. E. HARDY 3,047,282
UPHOLSTERY UNITS
Filed April 26, 1956 4 Sheets-Sheet 1

EDGAR E. HARDY INVENTOR
BY
ATTORNEY

July 31, 1962  E. E. HARDY  3,047,282
UPHOLSTERY UNITS
Filed April 26, 1956  4 Sheets-Sheet 2
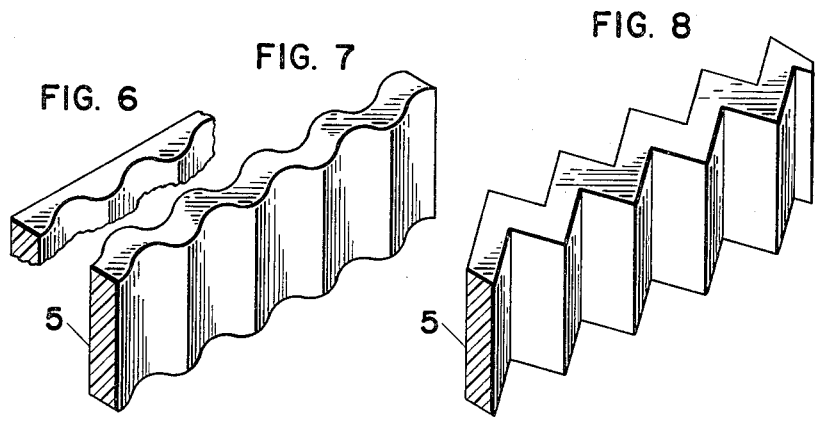
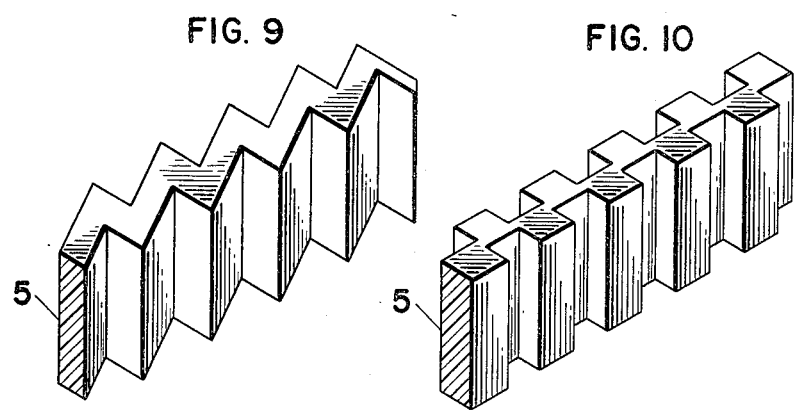
EDGAR E. HARDY  INVENTOR
BY Donald J Haefele
ATTORNEY July 31, 1962  E. E. HARDY  3,047,282
UPHOLSTERY UNITS
Filed April 26, 1956  4 Sheets-Sheet 3

EDGAR E. HARDY  INVENTOR
BY
ATTORNEY

July 31, 1962   E. E. HARDY   3,047,282
UPHOLSTERY UNITS
Filed April 26, 1956   4 Sheets-Sheet 4

EDGAR E. HARDY   INVENTOR
BY
ATTORNEY

United States Patent Office 3,047,282
Patented July 31, 1962

3,047,282
UPHOLSTERY UNITS
Edgar E. Hardy, New Martinsville, W. Va., assignor to Mobay Chemical Company, St. Louis, Mo., a corporation of Delaware
Filed Apr. 26, 1956, Ser. No. 580,951
6 Claims. (Cl. 267—1)

This invention relates to structural units for upholstery purposes and to upholstered articles produced therefrom.

In the present specification, the term "upholstered article" is used to designate cushions, mattresses, upholstered chairs, sofas, couches, divans, lounges, settees, love seats, hassocks, automobile seats, airplane seats and the like.

Heretofore, it has been common practice to build spring-like action into cushions, mattresses and other upholstered articles made from elastic foam by cutting core holes into them with a circular saw. This method of imparting additional springiness and softness to foamed plastics used for cushioning purposes is time-consuming and entails an appreciable loss of material, amounting to 50% or more of the foam. According to another method, holes are molded into the elastic foam, but this procedure is difficult to carry out with most foam systems.

It is an object of the present invention to provide structural units for upholstering purposes which can be produced in a simple and convenient manner. Another object is to provide upholstery units, the manufacture of which does not entail a loss of material. A further object is to provide upholstered articles comprising the upholstery units of the invention. A further object is to provide a process for making the new upholstery units. Still further objects will appear hereinafter.

It has now been found in accordance with the present invention that highly useful upholstery units can be obtained by cutting a block of elastic foam into strips defined by two straight parallel surfaces and by two parallel surfaces that change their direction so as to form hills and valleys, and fastening together the shaped strips thus produced in such manner as to provide a structure with regularly spaced partitions and cavities.

In order to obtain foam strips defined by two straight parallel surfaces and by two parallel surfaces that change their direction so as to form hills and valleys, a block of elastic foam may be cut in a great variety of patterns, representative examples of such patterns being illustrated in FIGURES 2 to 5 of the accompanying drawings. FIGURES 7 to 10 are perspective views of a wave-shaped, two zigzag-shaped and a gear tooth type strip, obtained by cutting a foamed block in the patterns illustrated in FIGURES 2 to 5.

In addition to the strips defined by two straight parallel surfaces and by two parallel surfaces that change their direction, there will be obtained at the upper and lower edges of the block from which the strips are cut two side strips defined by two straight parallel surfaces, one straight surface and one surface that changes its direction, as illustrated in FIGURES 1 and 6 of the drawings.

Elastic foams obtainable in block form and useful as building materials for the above strips include polyurethane foam, vinyl foam, latex foam and the like. These elastic foams preferably have a density within the range of 1.25 to 8.00 lbs. per cubic foot, a compression strength within the range 0.1–1.5 p.s.i. at 10% deflection, an indentation strength within the range 5–100 RMA, a tensile strength within the range 9–60 p.s.i. and an elongation within the range 50%–500%. The cutting of the foam block may be accomplished by any suitable means, such as band saws, dies and hot shaped wires.

The dimensions of the shaped strips used to form the upholstery units of the invention are not critical but may be varied within wide limits. In general, the height (numeral 5 in FIGURES 7 to 10) will range from about 1 inch to about 8 inches while the width (numeral 4 in FIGURES 2 to 5) of the strips will range from about ½ inch to about 3 inches. The length of the strips will, of course, depend upon the dimensions of the upholstered article to be produced and may be in the order of a few inches in the case of cushions and in the order of several feet in the case of mattresses. Depending upon the softness desired, the cavities in the upholstery units of the invention are made smaller or larger by varying the pitch (distance between the points indicated by numerals 1 and 2 in FIGURES 2 to 5) and the depth (indicated by numeral 3 in FIGURES 2 to 5) of the valleys accordingly. In many applications of the new upholstery units, the pitch will be within the range of 1 inch to 4 inches and the depth of the valleys will be within the range of ½ to 2.

In assembling the shaped strips to obtain the upholstery units of the invention, they are displaced from one another in such a manner as to have the foam of one piece touch the foam of the other piece at intervals with air space between. The same result may be obtained by inverting alternate strips. At points of contact, the strips are fastened together by any suitable method, such as gluing, sewing, welding, stapling or vulcanizing.

FIGURES 11 to 14 of the drawings show upholstery units obtained by properly assembling the strips illustrated in FIGURES 7 to 10.

Figure 15:
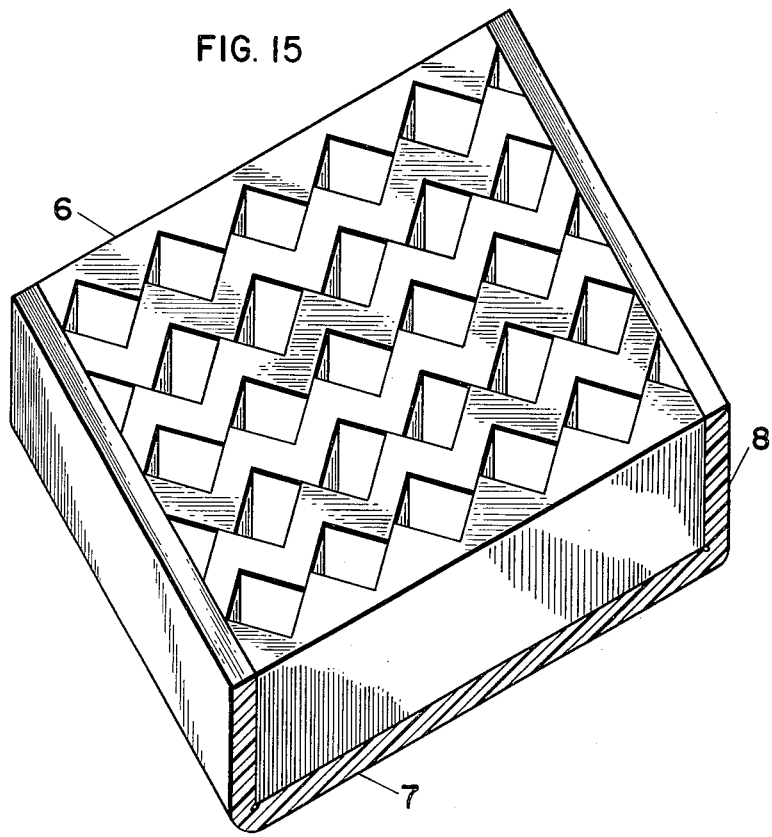

The upholstery units of the invention can be worked into upholstered articles in various ways. Thus, they may be provided with a covering plate (topper pad) and side walls to form a cushion or mattress. While the covering plate (topper pad) preferably consists of a piece of elastic material, such as elastic foam, the side walls can be made of either elastic or rigid material. FIGURE 15 of the drawing shows a seat cushion prepared by gluing a topper pad (numeral 7) and side pads (numeral 8) of elastic foam on the upholstery unit illustrated in FIGURE 12 (numeral 6).

The upholstery units of the invention are suitable for use in a great many applications where spring-like action is required. They offer the advantage of being extraordinarily light since they do not contain metallic parts (spiral springs).

The following example illustrates one way in which the invention has been carried into effect.

*Example*

Figure 3:
Figure 4:
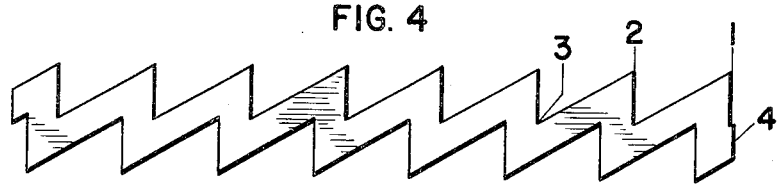
Figure 5:
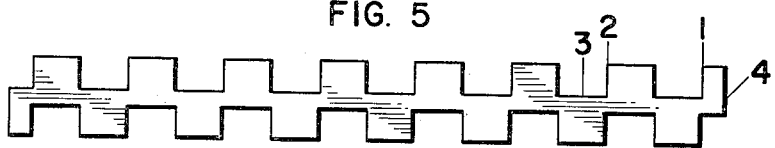
Figure 11:
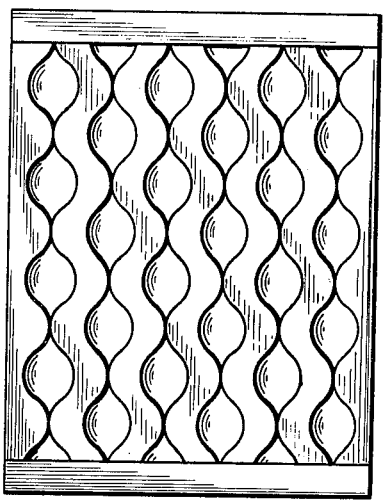
Figure 12:
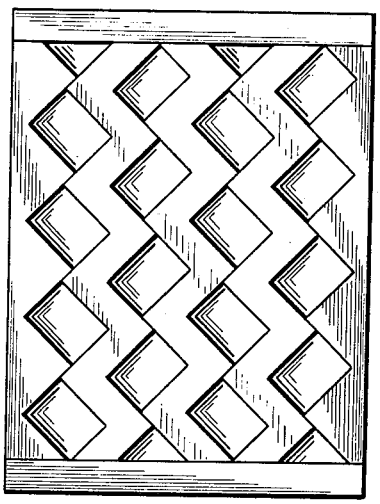
Figure 13:
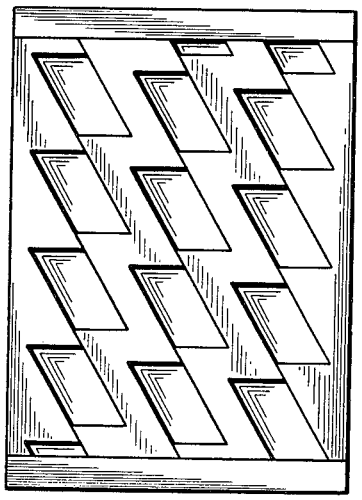
Figure 14:
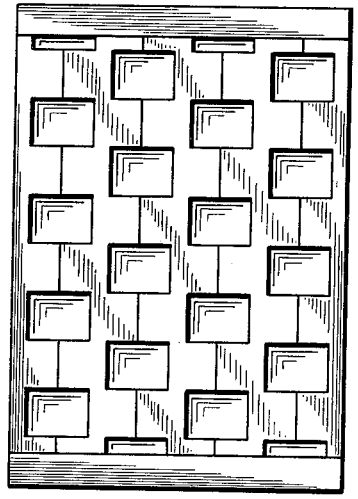

A 15" x 15" x 4" block of polyurethane foam having a density of 3.0 lbs./cu. ft., a compression strength of 0.75 p.s.i. at 25% deflection and a tensile strength of 15 p.s.i. was cut in the pattern shown in FIGURE 3 of the drawings to obtain strips as represented by FIGURE 8 of the drawings. These strips were about 15 inches long, 4 inches high and 1 inch wide. The pitch of the strips was about 3.5 inches and the depth of the valleys formed by the strips was about 1½ inch. Eight of these strips and the two strips obtained from the upper and lower edges of the block were glued together as shown in FIGURE 12, the glue line being about ½ inch.

The glue used was obtained from 100 parts of a linear polyester from adipic acid and ethylene glycol condensed to an hydroxyl number of about 65 and 9 parts of a mixture of 65% toluylene diisocyanate-2,4 and 35% toluylene diisocyanate-2,6. The polyester and the toluylene diisocyanate mixture were dissolved in a 4:1 mixture of ethyl acetate:acetone to form a 20% solution. Before the use of this adhesive, 5 parts of a polyfunctional isocyanate obtained by reacting excess toluylene diisocyanate with hexanetriol were added as a curing agent.

The adhesive was applied to both surfaces, the solvent was allowed to evaporate and the foam was placed together and clamped for a few seconds. A 1-inch topper pad and two 1-inch side pads were glued in the same manner to the top and sides to complete the cushion. The dimensions of the cushion thus obtained were about 17" x 23" x 5".

While certain representative embodiments and details have been shown for the purpose of illustrating this invention, it will be apparent to those skilled in the art that various changes and modifications may be made therein without departing from the spirit and scope of the invention.

Having described my invention, I claim:

1. As a new article of manufacture, an upholstery unit comprising a pair of spaced strips of cellular polyurethane having opposing longitudinally extending substantially parallel sides, a plurality of strips of cellular polyurethane having opposing longitudinally extending substantially parallel sides which lie in a plane generally perpendicular to the longitudinal axis of the first said strips and have one end secured to one of the said pair of strips and the other end secured to the other of the said pair of strips, each of the said plurality of strips forming a sinuous path substantially longitudinally opposed to the path of adjacent strips thereby forming a plurality of regularly spaced and regularly shaped cavities therebetween.

2. An upholstery unit as defined in claim 1 wherein said strips consist of elastic polyurethane foam having a density within the range of 1.25 to 8.00 lbs. per cubic foot, a compression strength within the range of 0.1 to 1.5 p.s.i. at 10% deflection, an indentation strength within the range of 5 to 100 RMA, a tensile strength within the range of 9 to 60 p.s.i. and an elongation set within the range of 50 to 500%.

3. An upholstered article comprising an upholstery unit as defined in claim 1 and a topper pad made of elastic foam.

4. Process for producing upholstery units which comprises making a series of cuts through a block of a foamed plastic, said cuts being in parallel surfaces to thereby obtain a series of equally shaped strips bounded by two straight parallel surfaces and by two parallel surfaces that change their directions so as to form regularly spaced hills and valleys, inverting alternate strips and fastening together the strips thus produced in such manner as to provide a structure with regularly spaced partitions and cavities.

5. Process in accordance with claim 4 in which said cutting is carried out with hot shaped wires.

6. Process in accordance with claim 4 in which said fastening is effected by gluing.

References Cited in the file of this patent

UNITED STATES PATENTS

| | | |
|---|---|---|
| 1,550,636 | Robinson | Aug. 18, 1925 |
| 2,194,364 | Minor | Mar. 19, 1940 |
| 2,382,208 | Corbin | Aug. 14, 1945 |
| 2,539,058 | Burns | Jan. 23, 1951 |
| 2,573,465 | Lundberg | Oct. 30, 1951 |
| 2,677,747 | Jaye | May 4, 1954 |
| 2,785,739 | McGregor et al. | Mar. 29, 1957 |
| 2,954,074 | Meyerhardt | Sept. 27, 1960 |

FOREIGN PATENTS

| | | |
|---|---|---|
| 293,086 | Great Britain | Jan. 25, 1928 |
| 376,937 | Great Britain | July 21, 1932 |
| 451,947 | Great Britain | Aug. 13, 1936 |